Dec. 15, 1953     E. R. PRICE ET AL     2,662,376
BOOSTER UNIT FOR HYDRAULIC PRESSURE SYSTEMS
Original Filed Oct. 4, 1943
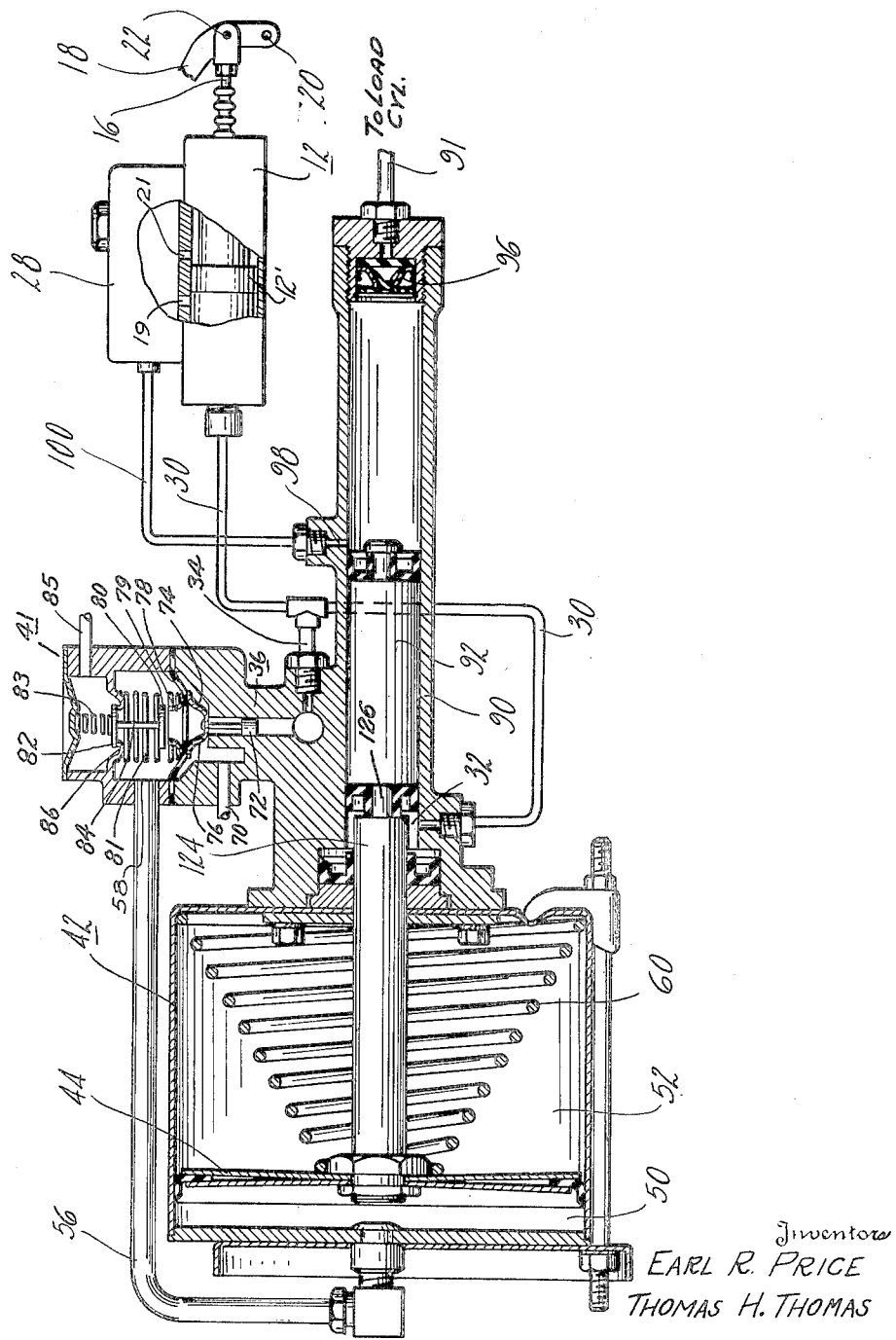
Inventors
EARL R. PRICE
THOMAS H. THOMAS
By T. J. Plante
Attorney Patented Dec. 15, 1953

2,662,376

UNITED STATES PATENT OFFICE 2,662,376

BOOSTER UNIT FOR HYDRAULIC PRESSURE SYSTEMS

Earl R. Price and Thomas H. Thomas, South Bend, Ind., assignors to Bendix Aviation Corporation, South Bend, Ind., a corporation of Delaware Original application October 4, 1943, Serial No. 504,854, now Patent No. 2,470,748, dated May 17, 1949. Divided and this application April 11, 1947, Serial No. 740,736

6 Claims. (Cl. 60—54.5)

This invention relates to a booster unit for a hydraulic pressure transmitting system which may be used for operating brakes or the like. This application is a division of application Serial No. 504,854, filed October 4, 1943, now Patent No. 2,470,748.

In patent application Serial No. 368,560, filed by Earl R. Price, and issued on July 18, 1944 as Patent 2,353,755, a hydraulic brake applying system is disclosed, wherein two master cylinders are provided, one manually operated, and the other power operated. The pressure created in the manually operated master cylinder cooperates with the power booster in creating pressure in the power operated master cylinder and additionally actuates a valve which controls the power booster. In brake applying systems of this type, the power booster, the power operated master cylinder, and the control valve for the power booster may be positioned wherever convenient on the vehicle to be braked since only fluid connections are required between these parts of the system and the remaining parts of the system. The brake applying system shown in said application has both "follow-up" and "feel." This means, first, that the pedal or the like which controls the manually operated master cylinder must be moved progressively farther to increase the force of brake application, and, second, that a pressure proportional to that developed by the booster reacts against the pedal to apprise the operator of the extent of brake application.

In brake applying systems of the kind just described, it has heretofore been necessary to provide a manually operated master cylinder of sufficient liquid capacity or displacement to fully apply the brakes in case of power failure. In other words, the manually operated master cylinder had to be approximately as large as the power operated cylinder which was directly connected to the wheel, or load, cylinders or motors at the several brakes. The use of a large manually operated master cylinder has certain disadvantages; or, stating it another way, the use of a small or miniature manually operated master cylinder has several important advantages.

The primary object of the present invention is to provide, for a hydraulic system of the general type under discussion, a low displacement manually operated master cylinder, appreciably smaller than the manually operated master cylinders heretofore required.

A corollary object of the present invention is to combine a relatively low displacement manually operated master cylinder with a relatively high displacement master cylinder which is directly connected to the load cylinders and which is operated by power and manual means acting in co-operation.

A more specific object of the present invention is to provide a manually operated master cylinder for a system of the type referred to which, by virtue of its relatively small size, may be mounted with ease and simplicity in the vehicle to be braked and connected to a pedal or treadle actuating member with a minimum of complications. The low displacement of the manually operated master cylinder permits locating it in a minimum of space and requires only a short travel of the manually operable pedal or treadle, which means that a minimum of leg room is required for the operator.

Another specific object of the invention is to reduce the initial pressure losses due to friction and other causes in a hydraulic system of the type referred to. This reduction of initial pressure losses results from the substitution of a smaller manually operated master cylinder. In a master cylinder, friction of the sealing cup and the load of the return spring constitute a substantial force which must be overcome when the master cylinder is actuated. These initial pressure losses are much higher in a large master cylinder than in a small master cylinder.

A further specific object of the present invention is to provide a manual and booster operated hydraulic system which may be controlled by the operator with the maximum of efficiency. To this end it is desirable that the initial pedal pressure on the part of the driver required to operate the brakes be relatively low. On the other hand, it is desirable to have a relatively high pressure per square inch in the liquid in the master cylinder for operation of the valve which actuates or controls the power booster. If a high displacement manually operated master cylinder is used, the ratio of pressure in the master cylinder to pressure applied manually at the pedal must of necessity be relatively low, whereas, if a low displacement manually operated master cylinder is used, the ratio of pressure in the master cylinder to manual pressure on the pedal may be relatively high. This is true because the total pedal travel available is limited, and the ratio of pressure in the master cylinder to manual pressure must be so planned as to permit a full stroke of the master cylinder piston before the pedal travel has run out.

A further object of the present invention is to provide a manual and power operated hydraulic system of such a nature as to permit the manufacturer of a series of vehicles to use substantially the same size manually operated master cylinder in all of such vehicles, and to vary the total brake output by varying the size of the power operated master cylinder and the booster. This permits the manually operated master cylinder and even the vehicle itself to be so designed that said manually operated master cylinder will fit satisfactorily into the space provided and will be easily lined up with the pedal or treadle.

Other objects and advantageous features of our invention will become apparent during the course of the following description, reference being had therein to the accompanying drawing, in which:

The figure is a part diagrammatic, part sectional view of a manual-and-booster-operated hydraulic system incorporating our invention.

In order to obtain the objects and advantages of our invention, we have provided a manual and booster operated hydraulic system comprising, essentially, two individual parts, one of which has a relatively low displacement and the other of which has a relatively high displacement. Another way of stating the same general thought is to say that the hydraulic means which is controlled at one end by the operator and which at the other end applies pressure to a load cylinder constitutes, in effect, two separate hydraulic systems, which have different volume-displacements. The high displacement hydraulic system includes the power operated master cylinder and the load cylinder or cylinders. The low displacement hydraulic system includes the manually operated master cylinder, the motor which actuates the booster controlling valve, and a follow-up or variable volume chamber or motor which increases in volume as the booster operated master cylinder piston moves, and which adds manual pressure to the booster created pressure acting on said booster operated master cylinder piston. We thus make it possible to obtain a greater fluid volume output from the booster operated master cylinder than has heretofore been possible, presupposing a given size manually operated master cylinder.

Referring to the drawing, a small, low displacement master cylinder 12 is provided with a piston 12' reciprocable therein which is mechanically connected by means of a rod 16 to a manually operable member, such as a pedal 18 pivoted on a fixed part of a vehicle at 20, and pivotally connected to the rod 16 at 22. The master cylinder bore is connected by means of the conventional recuperation and supply ports 19 and 21, respectively, with a liquid reservoir 28. The discharge end of the master cylinder bore is connected by means of a conduit 30 with a low displacement follow-up chamber 32, while a branch conduit 34 connects conduit 30 with a hydraulically operated control valve 41. The follow-up chamber 32, which may also be aptly termed an expansible chamber, a variable volume chamber, or a low displacement follow-up chamber, is defined by a cylinder 90 and a large diameter piston rod 124, both of which will be more fully described hereinafter.

The hydraulic master cylinder 12, chamber 32, and the hydraulic portion of the control valve to which conduit 34 is connected, together with the conduits, constitute an individual hydraulic system. This hydraulic system has a relatively low liquid volume displacement, i. e., a relatively small amount of liquid is displaced during the stroke of the piston in master cylinder 12. Losses of liquid in the system are compensated for, and development of vacuum in the system on the piston return stroke is prevented, by means of the ports connecting the bore of the master cylinder 12 directly to the reservoir 28.

The control valve to which conduit 34 is connected is arranged to control the operation of a power cylinder, or booster. The booster, which may be of any desired type, will vary in size according to the maximum hydraulic pressure and the fluid displacement required to operate the brakes. In the illustration, the booster is a differential air pressure power cylinder 42. The term "power cylinder" is intended to include all boosters having a pressure responsive movable wall therein, whether of the diaphragm type, or of the piston type. Furthermore, the term "differential air pressure" booster is intended to include both those units in which compressed air operates against air at atmospheric pressure and those units in which air at atmospheric pressure acts against partial or complete vacuum, as well as all other variations in the use of air as a pressure transmitting medium. The term "piston" as used in the claims is intended to include any pressure responsive movable wall, whether of the solid type or of the flexible diaphragm type.

Reciprocable in power cylinder 42 is a piston 44, which divides the power cylinder into chambers 50 and 52. Chamber 50 is connected by means of a pipe 56 to a port 58, which leads to the control valve. Chamber 52 is connected by means of a pipe (not shown) to a suitable source of vacuum, such as the conventional intake manifold.

The pressure in chamber 50 of the power cylinder is determined by the operation of the control valve 41. A small piston 72, which is reciprocable in motor 36, is connected by means of a cage 74, having openings 76, with a diaphragm 78. An annular member 79 connected to the diaphragm 78 provides a seat for a poppet 80, and a second poppet 82, connected to the first poppet by means of a link 84, is adapted to seat at 86 on an extension of the valve casing. With the valve parts in the position shown, pipe 70, which is connected to a vacuum source, such as the intake manifold, is in communication with pipe 56, which is connected to chamber 50 of the power cylinder. Since chamber 52 of the power cylinder is at all times connected to the vacuum source, the power cylinder is normally suspended in vacuum, and is maintained in the position shown by the return spring 60, until the valve 41 is actuated to change the pressure in chamber 50 of the power cylinder. The valve 41 is biased to released position by means of a spring 81, compressed between the casing and diaphragm 78. In addition, a small spring 83 may aid in maintaining the poppets in proper position.

In operation, pressure created in master cylinder 12 by movement of pedal 18 is transmitted to motor 36 where it exerts a pressure on piston 72, moving the piston and with it the diaphragm 78 and valve seat 79 against the resistance of spring 81. The poppet 80 seats at 79, cutting off communication between pipe 56 and the vacuum pipe 70. Further movement of piston 72 and diaphragm 78 forces poppet 82 off its seat 86, admitting air at atmospheric pressure from port 85 into the chamber between the two poppets and thence into pipe 56. Air flowing through pipe 56 into chamber 50 of the power cylinder creates a pressure differential over piston 44, urging it in the power applying direction, which, in Figure 1, is toward the right.

Valve 41 is "reactionary" in the sense that it is arranged to oppose its continued actuation with a pressure proportional to the pressure delivered by the power cylinder. After the poppet 80 is seated, the diaphragm 78 becomes a pressure responsive element subjected to differential pressures, one of which is the vacuum prevailing in the pipe 70, the other of which is the pressure prevailing in pipe 56, which corresponds substantially to the pressure acting on the piston of the power cylinder. Thus, a pressure proportional to that delivered by the power cylinder acts on diaphragm 78, urging it toward piston 72, and thus creating a reaction pressure in the liquid in master cylinder 12, which pushes against the pedal 18, giving the operator a "feel" to indicate the extent of power produced by the power cylinder, or booster.

The high displacement hydraulic system which actuates the load cylinder or cylinders, also called wheel cylinders or motors, comprises a large, high displacement master cylinder, or compressor, 90, which is connected by means of a conduit 91 to the load cylinders which apply the brakes, or accomplish other desired functions. The master cylinder 90 is appreciably larger in displacement than the master cylinder 12. This difference in volume may be provided by a difference in diameters of the master cylinder bores or by a difference in the length of stroke.

The master cylinder 90 has a piston 92 reciprocable therein, and positively connected to power cylinder piston 44. The forward end of the bore of master cylinder 90 is preferably provided with a residual pressure check valve 96, which maintains a slight pressure in the load cylinders even when the brakes are released. Compensation for losses in liquid in the large displacement hydraulic system is accomplished through a port 98 in the master cylinder wall and a conduit 100 which connects the large displacement master cylinder to the reservoir 28.

As previously stated, the follow-up chamber 32 is formed between the wall of the master cylinder 90 and the large volume displacement rod 124, which is connected to the power cylinder piston 44.

The rod 124 not only serves the purpose of transmitting pressure from the power cylinder piston to master cylinder piston 92, but additionally because of its relatively large diameter, limits the volume of the annular follow-up chamber 32 in accordance with the displacement available at the manually operated master cylinder 12. Rod 124 and piston 92 are connected together by a reduced diameter link 126. It is necessary that rod 124 move whenever piston 92 moves, in order that, in the case of power failure, the manually created pressure in chamber 32 can move piston 92 forward to apply the brakes without displacing any more liquid than that necessary to fill the small annular follow-up chamber. Thus, there is no danger of pushing the pedal to the floorboard without actuating the brakes.

In order to prevent the sealing cup at the rear of piston 92 from ever passing the compensating port 98, the piston 92 is made sufficiently long that, even at the end of the brake applying stroke, chamber 32 will not be in communication with port 98. It is vital that chamber 32 never come into communication with port 98, inasmuch as such communication would permit the liquid under pressure in chamber 32 to drain back to the reservoir 28.

Operation of the entire pressure creating and transmitting system is as follows:

By depressing the pedal 18 (the term "pedal" is intended to include broadly any manually operable member), the operator creates a pressure in master cylinder 12. This pressure is transmitted both to chamber 32, where it exerts a pressure on piston 92, and to the control valve where it exerts a pressure tending to cause chamber 50 of the power cylinder to be connected to air. As air passes through pipe 56 into chamber 50 of the power cylinder, a pressure differential is created acting over power cylinder piston 44, urging it toward the right to push piston 92 in the pressure creating direction. Thus piston 92 is subjected to the combined pressures of the power cylinder and of the liquid in chamber 32, the latter acting only on the small annular area which represents the difference between the areas of piston 92 and rod 124. Moving on its stroke, piston 92 displaces liquid under pressure to the load cylinders to apply the brakes.

As the power cylinder piston 44 moves on the power applying stroke, forward movement of piston 92 causes the volume of chamber 32 to gradually increase, thereby permitting liquid from master cylinder 12 to enter the follow-up chamber. This tends to reduce the pressure in the control valve and permit the valve to return to lapped position, unless the operator "follows up" by progressively depressing the pedal 18. As above noted, the control valve is also "reactionary," in the sense that it is arranged to oppose its continued actuation with a pressure proportional to the pressure developed by the power cylinder.

The displacement of the manually operated master cylinder 12 need only be sufficient to handle the displacement of follow-up chamber 32 plus the displacement of the control valve. The power operated master cylinder 90 must have a displacement adequate to match the required displacement of the load cylinder or cylinders.

Because of the low displacement of the manually operated hydraulic system, this system becomes, relatively speaking, a high pressure system. That is, assuming that a given displacement is necessary at the load cylinders, our invention permits the manually operated hydraulic system to be operated at a pressure much higher than has heretofore been possible. This is true because the low displacement of the manually operated hydraulic system permits a high ratio of pressure in the master cylinder 12 to pressure exerted by the operator on the pedal. On the other hand, the hydraulic system which includes the master cylinder 90 may be considered as a relatively low pressure system, in the sense that it operates at a lower pressure and higher displacement, assuming a given displacement of the manually operated master cylinder, than has heretofore been possible.

Use of a small, high pressure manually operated master cylinder has definite advantages. In addition to the advantages resulting from the smallness of the master cylinder, the high pressure at which it operates makes it possible to actuate the control valve at a low initial pedal pressure. The hydraulically operated control valve must be biased to released position, and therefore must have a return spring of the necessary strength. If a residual pressure is maintained in the low displacement hydraulic system, the strength of the return spring in the valve must be increased an additional amount. If, in order to make a relatively low initial pedal pressure operate the valve, the size of the valve piston is increased, a larger reaction diaphragm in the valve would be necessary to give the proper reaction; otherwise, the range of pedal pressures between initial brake application and full power application would be reduced, resulting in poor control of the brakes. By using a high pressure hydraulic control system, sufficient operating pressure is available in the control valve motor without need for a large piston.

In a normal brake application, the pressure per square inch developed in the manually operated master cylinder 12 may or may not be higher than the pressure developed by the power operated master cylinder 90. This is true because, even though the master cylinder 90 displaces a much larger quantity of fluid, the piston 92 is acted on by the pressures of both the power cylinder and the follow-up chamber 32. The entire unit, including both low displacement and high displacement hydraulic systems, together with the booster, is not necessarily a pressure multiplying unit, though it is a work multiplying unit. This means that, while the relative pressures per square inch in the large and small master cylinders may be varied according to design, the work accomplished at the load cylinder or cylinders is greater than that accomplished at the manually operated master cylinder 12, owing to the combination of power and manual work-accomplishing means.

It is important that the brake applying unit be operable to apply the brakes manually in case of power failure. We have previously pointed out that, in case of power failure, the manually created pressure in chamber 32 acts through piston 92 to apply the brakes. It is also important that, in case of power failure, insurance be provided against forcing the liquid from the low displacement hydraulic system into the high displacement system, and thereby running out of pedal travel without displacing sufficient liquid to apply the brakes. As previously explained, in the unit shown in Figure 1, we have avoided this danger by making piston 92 sufficiently long to prevent chamber 32 from coming into communication with port 98. Furthermore, port 98 is not connected to the bore of master cylinder 12 for the purpose of providing liquid compensation, as was the case in Price Patent 2,353,755, referred to above. Instead, the chamber in front of piston 92 is connected directly to reservoir 28.

Although certain particular embodiments of our invention have been described, it will be understood by those skilled in the art that the object of the invention may be attained by the use of constructions different in certain respects from those disclosed without departing from the underlying principles of the invention. We therefore desire by the following claims to include within the scope of our invention all such variations and modifications by which substantially the results of our invention may be obtained through the use of substantially the same or equivalent means.

We claim:

1. A system for operating a booster brake mechanism comprising a brake pedal, a master cylinder operatively connected with the brake pedal and having a recuperation port, a reservoir communicating with said cylinder through the recuperation port, a second master cylinder having a piston reciprocable therein and having a recuperation port, a conduit directly connecting the second master cylinder recuperation port to the aforesaid reservoir, a booster, a motor unit fed with pressure liquid from the pedal master cylinder to bring the booster into action, means operatively connecting the booster with the piston of the second master cylinder, and a variable volume chamber having a connection with said motor unit, said chamber being defined by the second master cylinder and the rear of said piston and caused to increase in volume as the booster moves said piston, thereby tending to reduce the liquid pressure in the motor unit, the recuperation port of the second-named master cylinder being so located as to at all times be free of communication with said chamber.

2. A system for operating a booster brake mechanism comprising a brake pedal, a master cylinder operatively connected with the brake pedal and having a recuperation port, a reservoir communicating with said cylinder through the recuperation port, a second master cylinder having a piston reciprocable therein and having a recuperation port, a conduit directly connecting the second master cylinder recuperation port to the aforesaid reservoir, a booster, a motor unit fed with pressure liquid from the pedal master cylinder to bring the booster into action, means for exerting through the pressure liquid of said motor unit a reactionary pressure against the brake pedal proportional to the pressure developed by the booster, means operatively connecting the booster with the piston of the second master cylinder, and a variable volume chamber having a connection with said motor unit, said chamber being defined by the second master cylinder and the rear of said piston and caused to increase in volume as the booster moves said piston, thereby tending to reduce the liquid pressure in the motor unit, the recuperation port of the second-named master cylinder being so located as to at all times be free of communication with said chamber.

3. A manual and booster actuated hydraulic system comprising a manually operable member, a low displacement master cylinder operatively connected with said member, a high displacement second master cylinder having a piston reciprocable therein, a differential air pressure booster, a hydraulically operated valve hydraulically connected to the manually operated master cylinder and operatively connected with the booster to effect operation of the booster, means opposing operation of said hydraulically operated valve with a pressure which rises progressively to indicate increasing pressure developed by the booster, a volume displacement rod operatively connecting the booster with the piston of the second master cylinder, and a low displacement follow-up chamber having a connection with said valve, said chamber being defined by the second master cylinder, by the rear of said piston, and by said rod, the diameter of at least that portion of said rod which has movement in said chamber being such as to occupy the major diametric portion of the chamber, the pressure in said chamber cooperating with the booster in moving said piston, and said chamber being caused to increase in volume as the booster moves said piston, thereby tending to reduce the liquid pressure operating the hydraulically operated valve.

4. A manual and booster actuated hydraulic system comprising a manually operable member, a low displacement master cylinder operatively connected with said member, a high displacement second master cylinder having a piston reciprocable therein, a differential air pressure booster, a hydraulically operated valve hydraulically connected to the manually operated master cylinder and operatively connected with the booster to effect operation of the booster, means opposing operation of said hydraulically operated valve with a pressure which rises progressively to indicate increasing pressure developed by the booster, a volume displacement rod operatively connecting the booster with the piston of the second master cylinder, the forward end of said rod being at all times in contact with the rear of said piston, and a low displacement follow-up chamber having a connection with said valve, said chamber being defined by the second master cylinder, by the rear of said piston, and by said rod, the volume of the chamber occupied by the rod being greater than the volume available for hydraulic fluid, the pressure in said chamber cooperating with the booster in moving said piston, and said chamber being caused to increase in volume as the booster moves said piston, thereby tending to reduce the liquid pressure operating the hydraulically operated valve.

5. A manual and booster actuated hydraulic system comprising a manually operable member, a low displacement master cylinder operatively connected with said member and having a compensating port, a high displacement second master cylinder having a piston reciprocable therein, a differential air pressure booster, a hydraulically operated valve hydraulically connected to the manually operated master cylinder and operatively connected with the booster to effect operation of the booster, means opposing operation of said hydraulically operated valve with a pressure which rises progressively to indicate increasing pressure developed by the booster, a volume displacement rod operatively connecting the booster with the piston of the second master cylinder, and a low displacement follow-up chamber having a connection with said valve, said chamber being defined by the second master cylinder, by the rear of the piston therein, and by said rod, said follow-up chamber being in communication with the first mentioned master cylinder, said chamber being caused to increase in volume as the booster moves said piston to thereby reduce the liquid pressure operating the hydraulically operated valve, said master cylinders being provided with independent liquid compensating connections whereby each liquid pressure system is independently supplied with liquid as required, the piston in the second master cylinder being longer than its full stroke, thereby preventing at all times escape of liquid from the first mentioned master cylinder through the follow-up chamber to the compensating connection of the second master cylinder.

6. A manual and booster actuated hydraulic system comprising a manually operable member, a low displacement master cylinder operatively connected with said member, a high displacement second master cylinder having a piston reciprocable therein, a differential air pressure booster, a hydraulically operated valve hydraulically connected to the manually operated master cylinder and operatively connected with the booster to effect operation of the booster, means opposing operation of said hydraulically operated valve with a pressure which rises progressively to indicate increasing pressure developed by the booster, a volume displacement rod having an operative connection at its one end with the booster and at its opposite end having an integral connection with the piston of the second master cylinder, and a low displacement follow-up chamber having a hydraulic connection with said valve, said chamber being defined by the second master cylinder, by the rear of said piston and by said rod, the diameter of at least that portion of said rod which has movement in said chamber being such as to occupy the major diametric portion of the chamber, the pressure in said chamber cooperating with the booster in moving said piston, and said chamber being caused to increase in volume as the booster moves said piston thereby tending to reduce the liquid pressure operating the hydraulically operated valve.

EARL R. PRICE.
THOMAS H. THOMAS.

References Cited in the file of this patent

UNITED STATES PATENTS

| Number | Name | Date |
|---|---|---|
| 1,885,580 | Bradbury | Nov. 1, 1932 |
| 2,218,191 | Dick | Oct. 15, 1940 |
| 2,252,482 | Gates | Aug. 12, 1941 |
| 2,260,490 | Stelzer | Oct. 28, 1941 |
| 2,322,063 | Schnell | June 15, 1943 |
| 2,352,357 | Almond | June 27, 1944 |
| 2,372,014 | Rockwell | Mar. 20, 1945 |
| 2,433,953 | Ingres | Jan. 6, 1948 |